UNITED STATES PATENT OFFICE.

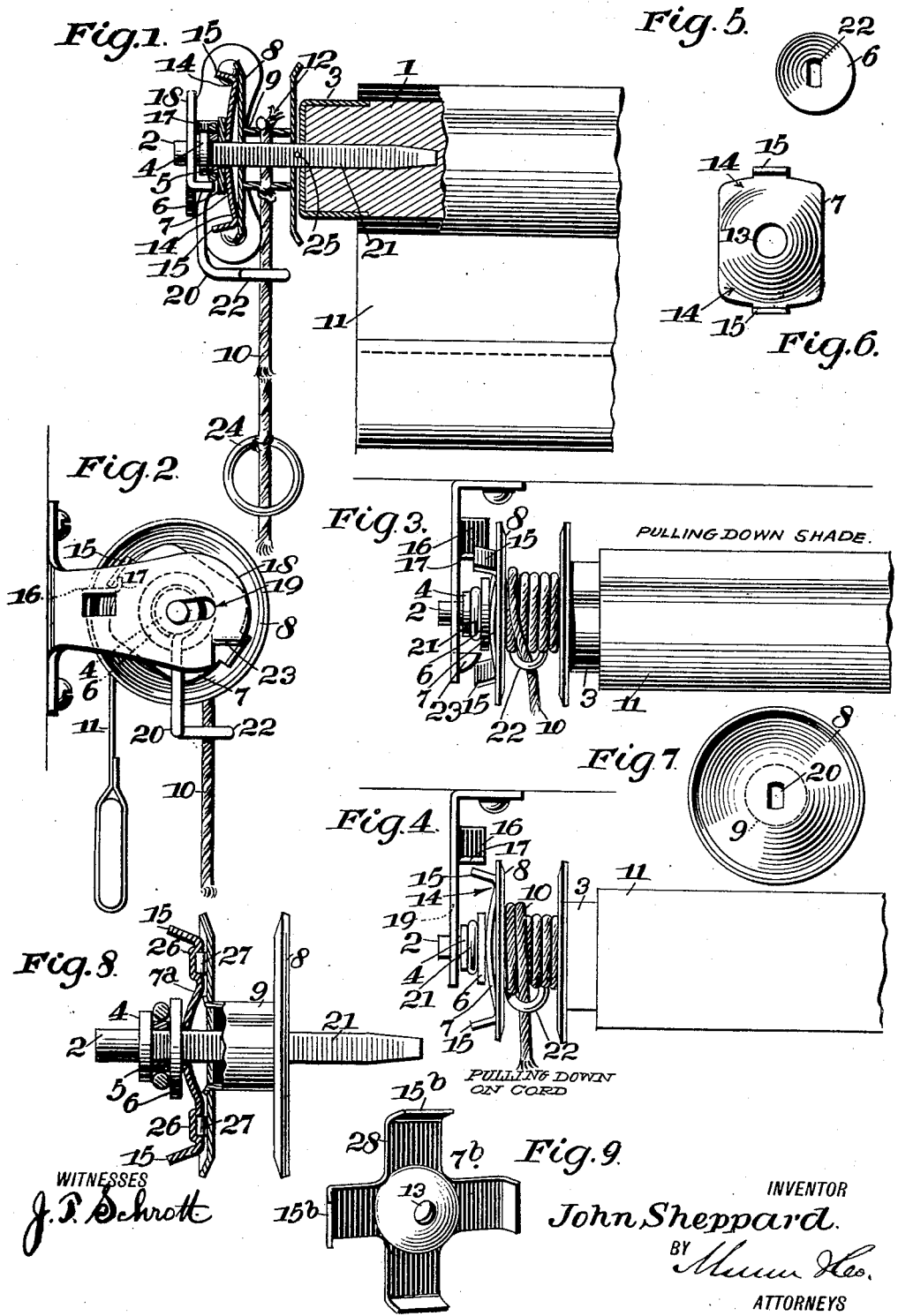

JOHN SHEPPARD, OF WINSTON-SALEM, NORTH CAROLINA.

WINDOW-SHADE ROLLER.

1,321,251.  Specification of Letters Patent.  Patented Nov. 11, 1919.

Application filed May 2, 1919. Serial No. 294,166.

*To all whom it may concern:*

Be it known that I, JOHN SHEPPARD, a citizen of the United States, and a resident of Winston-Salem, in the county of Forsyth and State of North Carolina, have invented certain new and useful Improvements in Window-Shade Rollers, of which the following is a specification.

My invention relates to improvements in window-shade rollers, and it consists in the constructions, combinations and arrangements herein described and claimed.

The foremost object of the present invention is to provide a novel and greatly simplified friction locking mechanism for a shade roller, wherein the friction is applied in pulling the shade so that the shade remains at any adjusted position, but is released in the act of again raising the shade.

A further object of the invention is to provide an improved friction shade roller lock, which is in operative combination with a particular bracket, both embodying instrumentalities causing the frictional locking of the roller in pulling the shade but releasing all friction on the roller in again raising the shade.

A further object of the invention is to provide in combination, a particular type of bracket and a shade roller with friction locking mechanism capable of limited sliding movement with respect to the bracket, whereby the function of frictionally locking the roller to various adjustments on pulling the shade, and releasing all frictional effort on the roller in again raising the shade, are accomplished.

Other objects and advantages will appear in the following specification, reference being had to the accompanying drawings, in which:—

Figure 1 is a vertical longitudinal section of one end of a shade roller showing the improved friction lock, Fig. 2 is an end elevation showing the position assumed when the shade roller lies normally in the bracket and also when the shade is drawn, Fig. 3 is a plan view showing the parts in the normal position and as they stand when the shade is drawn, Fig. 4 is a plan view showing the position of the parts when the shade is again raised by means of the cord, Fig. 5 is a detail view of the friction washer, Fig. 6 is a detail view of the friction plate or spring, Fig. 7 is a detail view of the cored drum, Fig. 8 is a sectional view illustrating a slight modification, wherein roller bearings are embodied in the friction plates, and Fig. 9 is a detail perspective view showing a friction plate for larger styles of shade rollers.

The present invention is an improvement on the shade roller friction lock disclosed in my co-pending application, filed January 15, 1919, Serial No. 271,247. Generally, that form of friction lock embodies a coil spring which presses friction washers respectively against the end of the shade roller and a ferrule which covers substantially all of the structure. A novel arrangement of adjusting the tension of the spring consists either in adjusting the ferrule on the end of the shade roller or making some adjustments of the axle of the shade roller.

This brief review is given simply to emphasize certain improvements in the present construction. But the present construction also embodies features not disclosed in the aforesaid application, and these are fully described below.

Referring then to the drawings, the shade roller 1 has an axle 2 driven into one end, a cap or ferrule 3 covering the end of the roller 1 to present a pleasing appearance and protect the end of the roller.

The outer extremity of the axle 2 is round, and spaced a short distance from the extremity of the axle is a collar 4 against which a loose washer 5 rests. Following the washer 5 in succession, is a friction washer 6, the spring plate 7 and cored drum 8, on the hub 9 of which the pull cord 10 is wound when the window-shade 11 is drawn down or unwound from the roller 1.

Normally, the cord 10 hangs straight down from the hub 9, it being suitably attached thereto at 12, as shown. As already stated, when the shade 11 is unwound, the cord 10 is wound on the drum 9, the cord coming in front, as clearly shown in Figs. 2, 3 and 4. The spring plate 7 is bowed or convexed in the middle so as to bear on the friction washer 6 in the region of the circular hole 13, and provide friction shoulders 14 which bear against the adjacent side of the drum 8.

Extending outwardly from the spring plate 7 adjacent to the friction shoulders 14, are locking lugs 15 which severally engage the abutment 16 behind the front shoulder 17, in the act of drawing the shade 11 down.

The purpose of the shoulder 17 is to positively maintain the engagement of either one of the lugs 15 with the abutment 16, so as to maintain and obtain the benefit of the tight frictional engagement between the friction shoulders 14 and drum 8. The shade 11 may be drawn to any desired adjustment and positively held there by virtue of this tight frictional engagement just referred to.

It is necessary to understand the construction of the bracket 18 before proceeding further with the description of the friction lock. In the first place, the abutment 16 is suitably stamped out of the bracket 18 as clearly shown in Fig. 2. Instead of making a single round hole for the round end of the axle 2, as is customarily the practice, the opening 19 is elongated, or takes the shape of a slot, but inclines downwardly toward the rear so that the round end 2 of the axle will naturally gravitate to the bottom of the opening.

This provision insures the automatic engagement of one or the other of the lugs 15 with the abutment 16 in drawing the shade 11, because the abutment 16 with its shoulder 17 is properly located in the path of rotation of the locking lugs, so that as stated, the nearest locking lug will engage the abutment 16 and stay there while the pull on the shade 11 continues. It can readily be perceived that the mutual engagement of a lug 15 with the abutment 16 will make a fixture of the spring plate 7, and the effort of turning the roller 1, by virtue of pulling on the shade 11, causes the drum 8 to rub against the spring plate, or in other words, tend to retard rotational movement.

It is to be observed in Fig. 7 that the drum 8 has a non-circular central opening 20 which fits the non-circular shank 21 of the axle 2. The drum therefore turns with the axle and roller 1. On the other hand, the opening 13 of the spring plate 7, is round and sufficiently larger than the shank 21 to permit free rotation of one with respect to the other. The friction washer 6 has a non-circular opening 22, which also fits the non circular shank 21.

The reader might question the purpose of the shoulder 17 on the abutment 15. It is true that the natural tendency of the axle 2 is to gravitate to the bottom of the slot 19 and thereby insure the striking of one or the other of the lugs 15 against the abutment 16. However, should it ever occur that a person pulls out on the shade 11, instead of pulling straight down, the axle 2 might ride forwardly and upwardly in the slot or opening 19 and thus convey the lugs 15 entirely out of the zone of the abutment 16.

When a lug 15 once engages behind the shoulder 17, no amount of forward inclination of the shade 11, by pulling outwardly thereon, can cause the parts to disengage and therefore the function of the frictional locking or spring plate 7 always operates.

Means for preventing tearing off the shade from the roller 1, consists of the arm 20 pivoted on the axle 2 at the end of 21, and provided with a loop 22 through which the cord 10 passes. The pivoted arm 20 swings freely on the axle 2, the washer 5 providing a space between the shoulder 4 and friction washer 6 so that the tension of the spring plate 7 does not interfere with the free swinging of the arm 20.

A stop 23, bent inwardly from the bracket 18, prevents the shade 11 from being torn off of the roller 1 when pulled down to the limit. It operates in this way: The pull cord 10 has a ring 24, or other weighted member, near the lower end. Obviously, as the shade 11 is pulled down, the cord 10 is rolled up on the drum 8. The ring 24, being properly located on the cord 10, will at a certain time go far enough up to engage the loop end of the pivoted arm 20, whereupon the tendency of the arm will be to swing forwardly against the stop 23 and so prevent further rolling up of the cord 10 on the drum 8, and consequently further pulling down of the shade 11. As stated before, this prevents the shade from being torn off of the roller.

*The operation.*

By way of brief review, the structure and operation of the improved roller lock consists of the following. The washer 5, arm 20, washer 6, spring plate 7 and cord drum 8 are successively slipped on the non-circular end of the axle 2. The drum 8 is pressed inwardly until sufficient tension is obtained by virtue of compressing the convexed spring plate 7 against the washer 6.

This being done, a pin 25 is slipped through the axle as shown in Fig. 1, to hold the parts in place. The axle is then driven into the end of the roller 1, and it makes no difference whether the drum 8 abuts the end of the roller or not. So long as one of the shoulders or locking lugs 15 of the spring plate 7 engages the abutment 16, the spring plate 7 will be held stationary while the shade roller 1 with the drum 8 and friction washer 6, can turn with respect thereto.

The reader will understand at once that any adjusted position of the shade 11 will be maintained by virtue of the pressure of the spring plate between the friction washer 6 and drum 8. Normally, one or the other of the lugs 15 always remains in engagement with the abutment 16 by virtue of the shoulder 17.

When the cord 10 is pulled, the shade roller with its carried part, is caused to revolve in the reverse direction, namely, forwardly toward the observer. This action naturally lifts the then engaging locking lugs 15 from the abutment 16 and also causes the axle 2 to ride upwardly in the elongated opening 19, bringing the locking lugs out of the zone of the abutment 16 and enabling a free counter-rotation of the roller 1 in again winding up the shade.

*The form in Figs. 8 and 9.*

These are two modifications. In Fig. 8, the spring plate 7ª has bearing recesses 26 stamped therein, for the housing roller of bearings 27 which engage the adjacent side of the drum 8. The friction between the various parts, which can here be identified by the same reference characters, obtains just the same, the purpose of the rollers 27 being to lessen the wear and tear on the surface of the drum 8, and preventing the wearing of a circular thin place on the drum.

The form of the spring plate 7ᵇ in Fig. 9 is intended more particularly for shade rollers of such a large diameter that a half revolution of the spring plate of the form shown in Fig. 6, would represent a considerable distance of movement of the shade 11, and thereby make fine adjustments of the shade impossible. The spring plate has four arms 28, each of which has a lug 15ᵇ equivalent to the locking lugs 15 on the spring plate in Fig. 6.

With this form of spring plate, i. e. in Fig. 9, the roller would have to revolve only a quarter revolution before an adjacent locking lug 15ᵇ came into engagement with the abutment 16. In its other respects, the spring plate 7ᵇ is like the first form, as can be seen by comparing the reference characters.

While the construction and arrangement of the friction locking device as herein described and claimed, is that of a generally preferred form, obviously modifications and changes may be made without departing from the spirit of the invention or the scope of the claims.

I claim:—

1. The combination, of a shade bracket, a revoluble shade roller axle slidably mounted in the bracket to gravitate to a normal position, friction locking means carried by the axle, turning freely with the axle when the axle is moved out of the normal gravitated position, and means carried by the bracket, positively engageable by said friction locking means when the axle is in the gravitated position, rendering the friction locking means operative to retard the rotation of said axle.

2. The combination, of a shade bracket, a revoluble non-circular axle with a circular part shiftably mounted to gravitate into a normal position in the bracket, friction locking means on the non-circular part including a movable friction member and co-acting non-moving friction members, and means carried by the bracket engageable by the movable friction member when in said normal gravitated position wherein the axle is frictionally revoluble in one direction, said axle being shiftable to move said movable friction member out of the zone of said means to enable the free revolution of the axle in the other direction.

3. The combination, of a shade bracket with a downwardly inclined opening, a non-circular roller axle with a circular end revolubly mounted in said opening, and normally gravitating to the lower part, friction locking means on the non-circular part including opposed relatively fixed friction members with an interposed movable friction member, and means embodied in the bracket in the zone of rotation of said movable member to prevent rotation thereof when the axle revolves in one direction, but being out of the zone of said movable member when the axle is shifted in the opening, enabling a free rotation in the other direction.

4. The combination, of a bracket with inclined guide means and an abutment, a revoluble non-circular shade roller axle with a circular portion engaging the guide means and normally gravitating toward the abutment, and friction locking means on the non-circular portion, including relatively fixed friction members with an interposed relatively revoluble friction member normally in the zone of the abutment to engage therebehind, causing relative frictional movement between said member and the axle and riding up on said guide means in revolving in one direction, said axle being freely revoluble on said guide means when moved to the other extremity when said movable member is in another zone.

5. Window-shade friction locking means, comprising in combination, a shade roller having a non-circular axle with a circular end, a friction washer fixedly mounted on the non-circular axle, a cored drum with a pull cord wound thereon, fixedly mounted on the non-circular axle; an interposed spring plate with locking lugs, pressing against the washer and said drum, and a shade bracket with downwardly inclined guide means to receive the circular axle end, and a shouldered abutment; the axle revolving freely in one position on the guide means when the locking lugs are out of the zone of abutment, but revolving in the other direction against the friction of said friction members when a locking lug is caught behind the shouldered abutment in the other position on the guide means.

6. A friction member, comprising a metallic body convexed to impart resilience and form friction shoulders, and provided with a plurality of engageable locking lugs.

7. A shade roller, having a non-circular axle with a collar and circular end, non-rotatable spacing and friction washers next to the collar, a non-rotatable cored drum with a cord attached thereto, a relatively rotatable friction member, formed to bear against the washer and drum, with a plurality of locking lugs; and a bracket with a downwardly inclined opening revolubly receiving the circular axle end which normally gravitates to the lower extremity, and having a shouldered abutment extending into the path of the locking lugs to retain the revoluble friction member and normally cause the axle to turn against the friction of its companion members, said axle revolving freely in the other direction without friction when shifted to the other extremity of the opening when said locking lugs cannot engage the abutment.

JOHN SHEPPARD.

Copies of this patent may be obtained for five cents each, by addressing the "Commissioner of Patents, Washington, D. C."